United States Patent [19]

Taniyama

[11] Patent Number: 4,789,975
[45] Date of Patent: Dec. 6, 1988

[54] APPARATUS FOR RECORDING AND/OR REPRODUCING DATA SIGNAL ON OR FROM DISK SHAPED RECORDING MEDIUM AT A VARIABLY SELECTED CONSTANT LINEAR VELOCITY

[75] Inventor: Seiro Taniyama, Kanagawa, Japan

[73] Assignee: Sony Corporation, Tokyo, Japan

[21] Appl. No.: 60,971

[22] Filed: Jun. 16, 1987

Related U.S. Application Data

[63] Continuation of Ser. No. 785,676, Oct. 9, 1985, abandoned.

[30] Foreign Application Priority Data

Oct. 17, 1984 [JP] Japan .................................. 59-218142

[51] Int. Cl.[4] .................... G11B 17/00; G11B 19/24
[52] U.S. Cl. ......................................... 369/50; 369/44;
369/59; 369/267; 360/73.03
[58] Field of Search ...................... 369/50, 267, 44, 59;
360/73; 358/342

[56] References Cited

U.S. PATENT DOCUMENTS

| 4,338,683 | 7/1982 | Furukawa et al. ................... 369/50 |
| 4,357,635 | 11/1982 | Haegawa et al. .................. 369/50 X |
| 4,512,006 | 4/1985 | Murakami et al. .................... 369/50 |
| 4,514,771 | 4/1985 | Stark et al. .............................. 360/73 |
| 4,530,018 | 7/1985 | Hoshiro et al. ......................... 360/73 |
| 4,530,083 | 7/1985 | Ishihara ................................. 369/267 |
| 4,535,439 | 8/1985 | Satoh et al. ....................... 369/32 X |
| 4,558,375 | 12/1985 | Sontheimer .......................... 358/342 |
| 4,603,412 | 7/1986 | Tamazaki .............................. 369/50 |

FOREIGN PATENT DOCUMENTS

52-77523  6/1977  Japan .................................. 358/342

*Primary Examiner*—Aristotelis M. Psitos
*Attorney, Agent, or Firm*—Alvin Sinderbrand

[57] ABSTRACT

An apparatus for recording and/or reproducing a data signal on or from a disk shaped recording medium having a special track in which control information is prerecorded. The apparatus reproduces the control information at first when the disk is mounted therein, and stores the reproduced control information in a memory. A rotation control cirucit for controlling the rotation of the recording medium is supplied with a control signal based on the control information read out of the memory and controls the rotation of the medium such that the linear velocity of the rotation is of a predetermined constant value according to the control information.

3 Claims, 5 Drawing Sheets

APPARATUS FOR RECORDING AND/OR REPRODUCING DATA SIGNAL ON OR FROM DISK SHAPED RECORDING MEDIUM AT A VARIABLY SELECTED CONSTANT LINEAR VELOCITY

This is a continuation of application Ser. No. 785,676, filed Oct. 9, 1985 now abandoned.

BACKGROUND OF THE INVENTION

1. Field of the Invention

The present invention relates to a recording and/or reproducing apparatus using such a recording medium as an optical disk, an optical and magnetic disk, a magnetic disk, or the like.

2. Description of the Prior Art

While such recording media as optical disks, optical and magnetic disks, and so forth have become widely used, there are two systems for controlling rotation of these disks: the constant linear velocity system (CLV system) and the constant angular velocity system (CAV system). In the CLV system, the angular velocity is gradually reduced as the head moves radially from the inside of the disk to the outside thereby to keep the linear velocity always constant, and this CLV system affords a larger data recording volume than that with the CAV system which controls the angular velocity to be kept always constant. Because uniform recording density is achieved thereby, the CLV system provides another merit that such factors for the recording and/or reproducing circuit as that for waveform equalization need not be varied.

Generally speaking, however, the structure of the servo circuit for controlling the rotation of the disk by the CLV system is more complex than that by the CAV system. Namely, the rotation control circuit in the CLV system is so arranged that coarse controlling of the number of revolutions of the spindle motor is made depending on the reproducing position of the head on the disk and finer controlling, in addition, is made to keep the period of a clock signal in the data reproduced from the disk at a predetermined value. Besides, if the preset linear velocities are different from disk to disk for the reason that the manufacturers of these disks are different or other reason, then it will become necessary to provide a disk recording and/or reproducing apparatus with the control information in accordance with each disk from outside.

When it is attempted to record or reproduce a data signal on or from disks which are set at different linear velocities using the same recording and/or reproducing apparatus, as stated above, the user has to input necessary control information to the apparatus from outside referring to operation manuals or the like each time a disk is loaded into the apparatus.

When it is required, as hithertofore, to provide from outside a recording and/or reproducing apparatus with control information necessary for attaining rotation control at a constant linear velocity each time a disk is set on the apparatus, not only is it troublesome to confirm the control information for each disk, but also there are risks of erroneous control information to be input.

SUMMARY OF THE INVENTION

Accordingly, it is an object of the present invention to provide an improved recording and/or reproducing apparatus free from the defects encountered in the prior art.

Another object of the present invention is to provided a recording and/or reproducing apparatus in which the operation for initial set can be simplified.

A further object of the present invention is to provide a recording and/or reproducing apparatus which can avoid the incorrect operation of a control circuit of the disk rotation caused by an erroneous input.

According to an aspect of the present invention, there is provided an apparatus for recording and/or reproducing a data signal on or from a disk having a special track in which a control information is prerecorded, the apparatus first reproduces the control information and stores the reproduced control information in a memory, and the disk is rotated such that the linear velocity of the rotation of the disk is a predetermined constant value in accordance with the control information read out from the memory.

The other objects, features, and advantages of the present invention will become apparent from the following description taken in conjunction with the accompanying drawings.

DESCRIPTION OF THE PREFERRED EMBODIMENT

Figure 1:
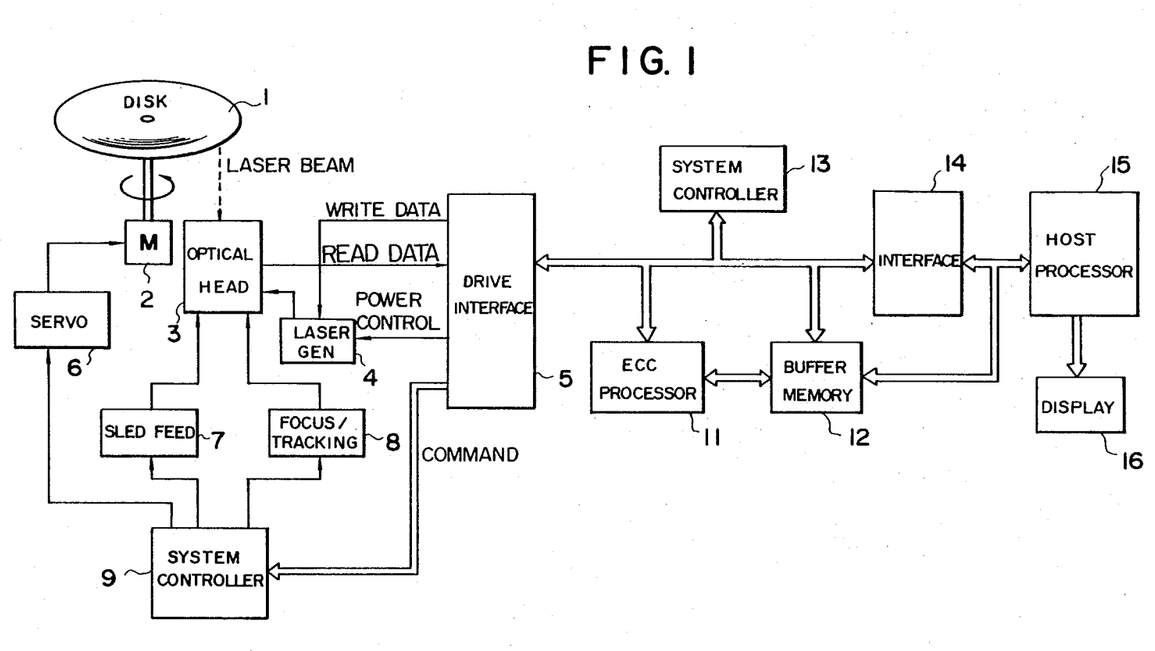
FIG. 1 is a block diagram showing an overall structure of the recording and/or reproducing apparatus of a preferred embodiment of the present invention.

FIG. 1 shows structure of a preferred embodiment of the present invention applied to an optical disk recording and/or reproducing apparatus.

Referring to FIG. 1, reference numeral 1 denotes a disk and the disk 1 is rotated by a spindle motor 2. The disk 1 is formed of a glass or synthetic resin substrate coated with a metallic layer of bismuth or the like and further plated thereover. There are formed pits in the metallic layer of the disk 1 being melted and deformed at the positions irradiated by a recording, or writing, laser beam from an optical head 3. A reading laser beam from the optical head 3 is adapted to be modulated by the written data.

The disk 1 is provided with a plurality of spiral tracks formed thereon, each track being divided into a plurality of sectors. An address portion is provided by precutting in each of the sectors in the disk 1 as a set of existence and nonexistence of the pits, and a digital signal is adapted to be recorded in a specific sector, or reproduced from a specific sector, according to the address reproduced from the address portion.

The optical head 3 is provided with an objective lens, a beam splitter, a light modulator, a light receiving element, a detector for focusing error and tracking error, and the like, and supplied with a laser beam from a laser generating circuit 4 including a semiconductor laser. The laser generating circuit 4 is supplied with the write data through a drive interface 5 and the read data read by the optical head 3 is taken out through the drive interface 5. The laser generating circuit 4 is supplied with a power control signal from the drive interface 5 in order that the power of the laser beam is made larger at the time of writing (recording) than at the time of reading (recording).

A servo circuit 6 is provided for enabling the disk 1 to rotate at a constant linear velocity or at a constant angular velocity. The servo system 6 is structured so as to support either of the CLV system providing a constant linear velocity and the CAV system providing a constant angular velocity. On the other hand, the optical head 3 is enabled to sled radially of the disk 1 by means of sled feed portion 7 formed of a linear motor. The optical head 3 is adapted to make good focusing and tracking operations by means of a focusing and tracking servo 8. The output of detected focusing error and tracking error are supplied to a system controller 13. A command is supplied through the drive interface 5 to a system controller 9 and control signals for each of the servo circuit 6, sled feed portion 7, and the focusing and tracking servo 8 are generated by the system controller 9.

Figure 2:
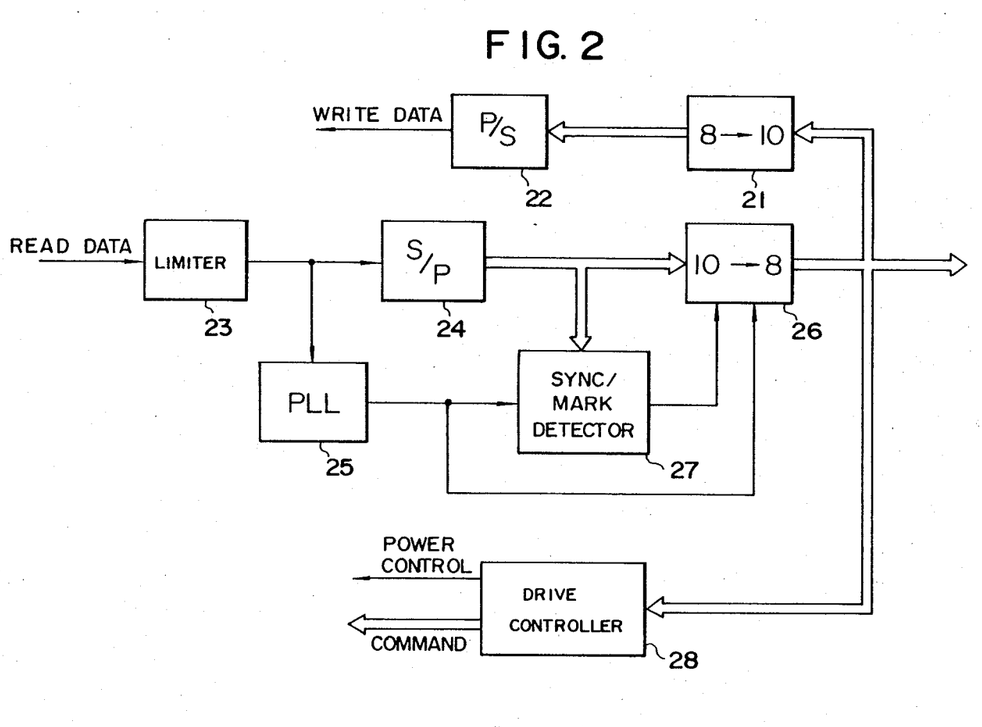
FIG. 2 is a block diagram showing a structure of a portion of a preferred embodiment of the invention.

The drive interface 5 is structured as shown in FIG. 2. Referring to FIG. 2, 21 denotes an encoder of block coding for converting an 8-bit pattern to a 10-bit pattern which is desirable, namely, including less d.c. component. The output of the encoder 21 is applied to a parallel-to-serial converter 22 and the write data are formed thereby. The read data from the optical head 3 are supplied through a limiter 23 to a serial-to-parallel converter 24 and to a PLL 25. The output of the serial-to-parallel converter 24 is supplied to a decoder 26 of block coding and a synchronous signal/mark detector circuit 27.

The PLL 25 extracts a bit clock from the read data and supplies the bit clock to the decoder 26 and the sync/mark detector circuit 27. The sync/mark detector circuit 27, upon detection of a synchronous signal and a mark (address mark or data mark) from the read data, generates a timing signal in synchronism with the read data and supplies the timing signal to the decoder 26. Further, a drive controller 28 generates the command for the system controller 9 for driving and the power control signal.

Formation of the write data, processing of the read data, and formation of the data for the drive controller 28 are performed by an error correction code processor 11, a buffer memory 12, and the system controller 13. The system controller 13 controls the initial operation of the disk 1 so that control conditions and data for display (the data will be described later) precut in the innermost track of the disk 1 may be reproduced immediately after the disk 1 is loaded, and these control conditions and data for display are applied to the system controller 13, whereby the data relative to control conditions to be supplied to the drive controller 28 are formed by the system controller 13.

On the other hand, a host processor 15 is connected with the optical disk recording and/or reproducing apparatus through an interface 14. The data for display out of the above mentioned control conditions and data for display reproduced from the innermost track are displayed by means of the host processor 15 on the screen of a display apparatus 16 formed of a CRT, liquid crystal, or the like.

The error correction code processor 11 provides an error correction coding treatment at the time of recording, and the error correction coded record data is converted into a piece of write data put in a predetermined format, whereby an error correction treatment of the read data can be made at the time of reproducing.

Figure 3:
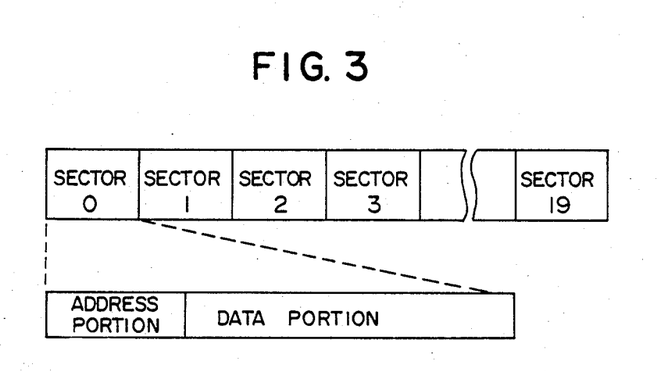
FIG. 3 is a schematic diagram showing a data structure in a preferred embodiment of the invention.

As shown in FIG. 3, a track in the disk 1 is divided into 20 sectors from 0 to 19, for example, each sector including 1 kilo bytes of data amount. Writing data or reading data is performed in the unit of one sector, namely, a data transfer is made between the disk drive portion and the host processor 15 in the unit of one sector. Each the sector includes an address portion and a data portion. The address portion is that which is precut in a predetermined data structure by the manufacturer of the disk. In each of the address portion and the data portion are inserted a synchronous signal and a mark signal in addition to the address or the data.

Figure 4:
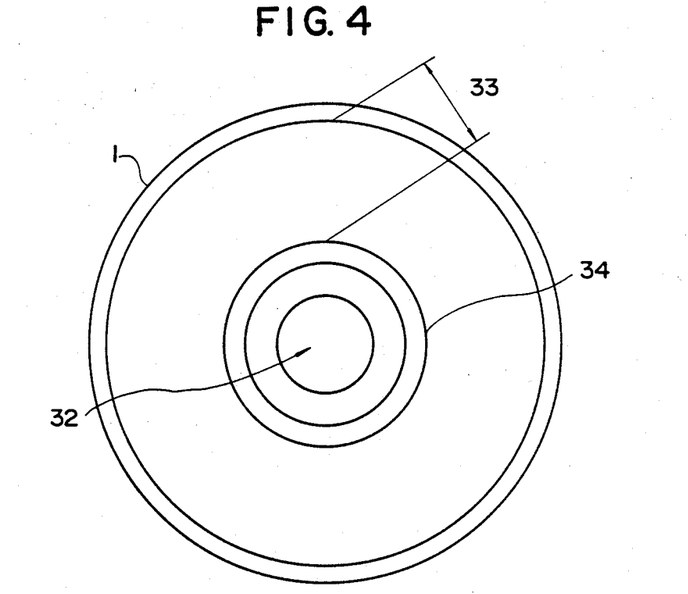
FIGS. 4 and 7 are plan views showing distribution of tracks in a disk of a preferred embodiment of the invention.

FIG. 4 shows one face of the disk 1. The disk 1 is provided in its center with a center hole 32 for engaging the disk 1 with the rotating spindle. Reference numeral 33 indicates a recording area (program area) formed of approximately 19000 tracks from the innermost track to the outermost track. Inward from the recording area 33, there are formed a predetermined number of lead in tracks, and outwardly from the recording area 33, there are provided a predetermined number of lead out tracks. The track within the recording area is provided with the data structure as shown in FIG. 3. The address portion of each sector in each track within the recording area 33 is provided by precutting by means of the optical head 3 with the track address serially increasing from inside to outside and the sector address in each track.

In the present embodiment, data for the control conditions of the recording and/or reproducing apparatus at the time of writing or reading the disk 1 are precut in the innermost track 34 of the recording area 33. The innermost track 34 is adapted to be read by the optical head 3 at first when the disk 1 is set on the recording and/or reproducing apparatus.

The control conditions and data for display are broadly divided into disk parameters, ID for manufacture, disk conditions, ID for areas and ID for statement. An example of the control conditions and the data for display which are precut in the innermost track 34 will be shown in the following:

| Recorded Information (Disk Parameters) | Number of Bytes |
| --- | --- |
| No. of Bits of Innermost Track | 4 |
| CLV Factor (Ct) | 4 |
| Track Pitch | 4 |
| No. of Sectors in Innermost Track | 4 |
| Radius of Innermost Track | 1 |
| Constant to be determined by Recording Density and Data Rate | 1 |

The above CLV factor (Ct) is a number showing how many rotations of the disk 1 will increase the number of sectors by unity and the same is a factor which becomes necessary at the operation by the CLV system for operating the servo circuit 6 according to the reproducing position of the optical head 3. The CLV factor (Ct) is also used to indicate of which system of the CLV system, the CAV system, and the mixture of these the recording system of the disk is. That is, the CLV factor for the disk of the CAV system or of the mixture of the CLV and CAV systems is represented as the data of a special bit pattern. And therefore, the control operation of the servo circuit 6 is selectively changed according to the CLV factor. The number of sectors in the innermost track is the number of the sectors in the track number 0 of the disk 1.

Figure 5:
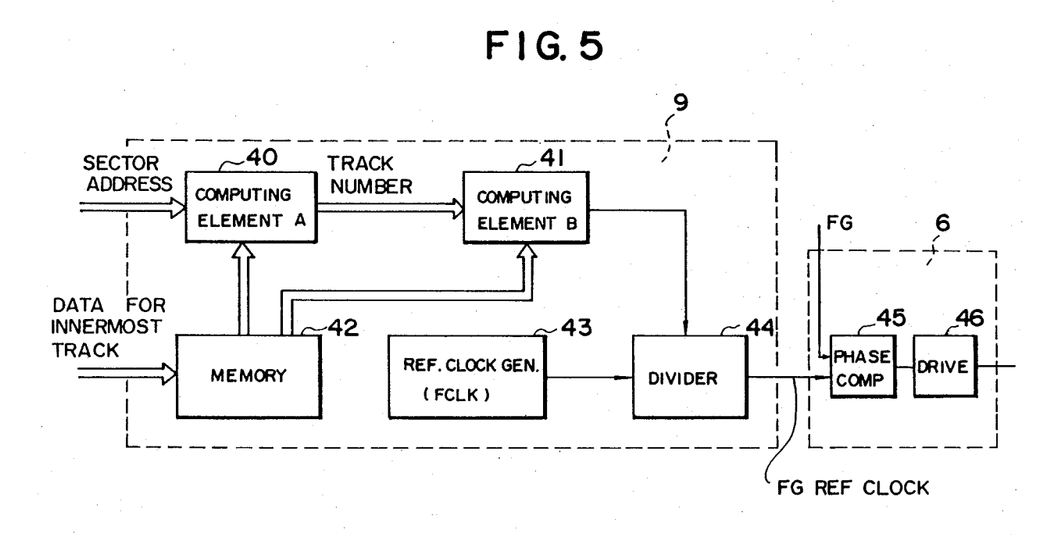
FIG. 5 is a block diagram for explaining CLV system spindle servo controlling in a preferred embodiment of the invention.

An example of controlling by the spindle servo circuit in the event of the CLV operation will be described on the basis of the above mentioned data with reference to FIG. 5. A part of the system controller 9 indicated in FIG. 1 is structured as shown in the portion encircled by a dotted line in FIG. 5.

When the disk is mounted, the innermost track is first reproduced and the data recorded in this track are written in a memory 42. Then, an arithmetic unit A 40, to which the sector address obtained from the reproduced data are supplied and, further, the number of sectors in the innermost track and the CLV factor out of the data written in the memory 42 are supplied, computes the track number to which the sector belongs. Further, an arithmetic unit B41, to which the track number obtained by the arithmetic unit A40 as well as the information on the track pitch, the radius of the innermost track, and the constant to be decided by the recording density and the data rate out of the data stored in the memory 42 are supplied, generates frequency data for the reference signal to be supplied to the servo circuit and, finally, provides frequency dividing data for a divider 44 to divide a reference clock from a reference clock generating circuit 43 having an oscillating frequency, $f_{clk}$. The output of the divider 44 is supplied as an FG reference clock to a phase comparing circuit 45 in the servo circuit 6, where the FG reference clock is subjected to phase comparison with an FG output and the output thereof is supplied through a drive circuit 46 to the motor for controlling the same.

Figure 6:
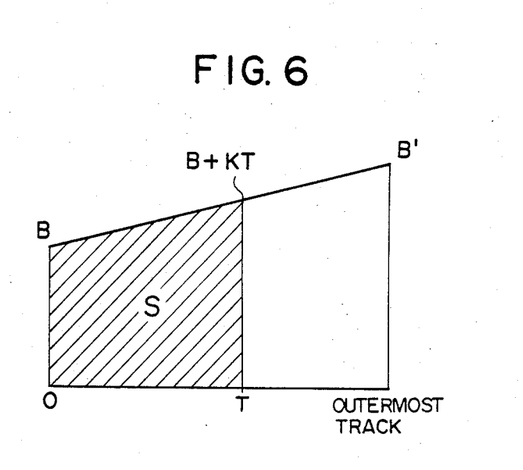
FIG. 6 is a diagram showing the relationship between the sector address and the track number.

Now, the contents of the arithmetic unit A40 and the arithmetic unit B41 will be described with reference to FIG. 6. As stated earlier, the sector addresses are serially assigned to sectors outwardly from the innermost track. The relationship between these sector addresses and the track number T is as shown in FIG. 6. Assuming that there are sectors of B in number in the innermost track 0 and sectors of B' in number in the outermost track, the inclination of the line B—B' corresponds to the CLV factor, Ct, written in the above mentioned memory 42. Since the CLV factor represents the inverse number of the number of the tracks that will increase the number of the sectors by unity, the number of the sectors at a given track becomes B+Ct·T, and thus the relationship between a sector address S and the track number T will be expressed by the following:

$$B(T-1)+(\tfrac{1}{2})Ct(T-1)^2 < S \leq BT+(\tfrac{1}{2})Ct\cdot T^2$$

Hence, the track number T to which a sector address S belongs will be given by the following:

$$T=(1/Ct)(\sqrt{B^2+2Ct\cdot S}-B),$$

or, to be precise, the wanted track number will be the integer obtained by raising fractions to a unit in the solution T above.

From the track number T obtained by the arithmetic unit A40 and the track pitch data P, the radius r of the track 0, and the constant k to be determined by the recording density and the data rate which are supplied from the memory 42, the FG reference clock frequency F to be supplied to the servo circuit is computed by the arithmetic unit B41. The relationship between the frequency F and the track number T is given by:

$$F=k/(PT+r).$$

The frequency dividing ratio N to be supplied to the divider 44 is calculated from $$N=f_{clk}/F,$$

and this ratio N is supplied to the divider 44. As described so far, the optimum FG reference clock for a CLV servo operation is easily generated from the sector address obtained from any reproducing position. By the way, the above described arithmetic operation can also be carried out by means of software processing by a microcomputer or the like.

While the above described example is of the case where the entire surface of the disk is provided with the record area for the CLV system, the case where the record area for the CAV system is mixed in can, in principle, be processed in the same manner as above through the computation becomes somewhat complex.

| Recorded Information (ID for Manufacture) | No. of Bytes |
| --- | --- |
| Term of Guarantee for Writing | 4 |
| Term of Guarantee for Reading | 4 |
| Date of Manufacture | 4 |
| Spare Space | 4 |

The term of guarantee for writing and that for reading in the ID for manufacture show the periods (dates) up to which times writing and reading guaranteed by the manufacturer are properly made, respectively. The spare space is a record area prepared for increasing the record information of ID for manufacture.

| Recorded Information (Disk Conditions) | No. of Bytes |
| --- | --- |
| Identification of Face A/B | 1 |
| Capability of Writing | 1 |
| Spare Space | 14 |

The above identification of face A/B is used for identifying the face of the disk to write or read. The above capability of writing shows whether or not writing is allowed. If the entire surface of the disk is precut, then writing is not allowed.

| Recorded Information (ID for Areas) | No. of Bytes |
| --- | --- |
| Addresses for CLV Areas (5 sets) | |
| Start Address (3 bytes) | 15 |
| End Address (3 bytes) | 15 |
| Addresses for CAV areas (2 sets) | |
| Start Address (3 bytes) | 6 |
| End Address (3 bytes) | 6 |
| Spare Space | 6 |

The above ID for areas indicates, in the case where both the CLV recording area and the CAV recording area are included in the precut area in one disk, the start position and the end position of each area by the corresponding track address. By the ID for areas, the servo circuit 6 is switched so as to correspond to the reproducing position in the disk 1, and the disk which is provided with areas of the both systems can be properly rotated by the spindle motor 2. That is, if an area recorded by the CAV system is to be reproduced, the spindle motor should rotate at a constant number of revolutions, and therefore, a constant FG reference clock should be supplied to the servo circuit 6. In order to attain this, the reproduced sector address and the start address and end address in each of the above mentioned area are compared and, after judgment is made whether to CLV recording area or to the CAV recording area the sector belongs, the output of the divider 44 shown in FIG. 5 and the fixed FG reference clock are selected according to the output of the above judgment.

Figure 7:
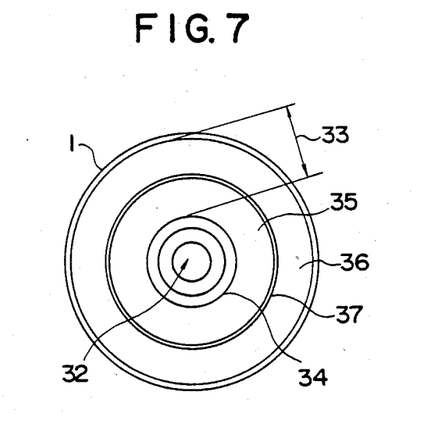

FIG. 7 shows an example of a disk 1 in which both the CLV recording area and the CAV recording area are included. In the recording area 33 of the disk 1, the CAV recording area 35 is disposed on the inside and the CLV recording area 36 is disposed on the outside. Between the two recording areas 35 and 36, there is provided a no-signal area (guard space) 37 for compensating for the transient state of the servo circuit 6 at the instant its operation is switched from one to the other.

In case of the CAV system, the recording density on the disk 1 is the higher the inner is the track. Therefore, it is desirable to provide the CAV recording area 35 on the inner side. In the present embodiment, it is arranged that digital data are recorded on both of the recording area 35 and recording area 36. The data record can be either precut record or that to be freshly recorded by means of the optical head 3. In case of precutting, both of the recording areas 35 and 36 can be recorded with the same digital data so that the disk can be reproduced by a disk reproducing apparatus either of the CLV system or of the CAV system.

Further, different from the present embodiment, it can be arranged that an analog signal, a frequency modulated video signal, for example, can be recorded in the recording area 35 for the CAV system.

| Recorded Information (ID for Statement) | No. of Bytes |
| --- | --- |
| Manufacture Character ID | 12 |
| Manufacture Bit ID | 4 |
| Physical Character ID | 12 |
| Physical Bit ID | 4 |

The character ID out of the above ID for statement are coded alphabet, symbols, or other character data (ASCII code, for example). The manufacture character ID is, for example, for indicating the manufacturer of the disk, and the physical character ID is, for example, for indicating the diameter of the disk. The character ID of the ID for statement is supplied from the system controller 13 through the interface 14 to the host processor 15 to be displayed on the screen of the display apparatus 16.

By the display with the character ID, the user is informed of physical characteristics of the disk mounted, the contents of records in a disk 1 when it is precut, and so forth.

The above control conditions and data for display are provided with the error correction coding treatment similarly to the digital data on the other tracks and recorded in a multiple manner in the innermost track 34, whereby error data are prevented from occurring at the time of reading as much as possible.

By the way, another parameter than the CLV factor can be used as the controlling information for rotating the disk at a constant linear velocity.

According to the present invention, it is enabled to provide a disk 1 with both the CLV recording area 36 and the CAV recording area 35, and therefore, the optimum rotation control system can be adopted according to the class of the signal recorded and a disk can be made from restriction by the rotation control system of a disk record reproducing apparatus. Since, further, the address information to identify the recording areas for the two systems are recorded in the innermost track 34 from the beginning, correct recording on or reproducing from the disk can be achieved, without troublesome operation in either case of the two rotation control systems, only by causing the address information to be reproduced at first when the disk 1 is set on the apparatus and to be supplied to the system controller.

What is claimed is:

1. In an apparatus for recording and/or reproducing a data signal on or from a disc shaped recording medium having substantially spiral successive tracks arranged in series and in each of which a respective plurality of sectors are formed, said sectors having recorded therein respective address codes numbered in series from one to the other end of said series of successive tracks, said disc shaped recording medium including a special track in which at least control information is recorded indicative of a desired constant linear velocity of said recording medium during reproduction of said data signal within a CLV recording area on said recording medium and used for controlling the rotation of said recording medium in a CLV reproducing mode of said apparatus, said desired constant linear velocity being one of a plurality of values within a predetermined range, said control information recorded in said special track including a parameter indicating the inclination of the increase of the number of sectors from one to another of said successive tracks, said apparatus comprising:

a recording and/or reproducing head;
means for initially reproducing the control information from said special track on said recording medium;
memory means;
means for writing the initially reproduced control information in said memory means;
means operative in a reproducing mode of the apparatus for reading said control information which has been written in said memory means;
means for separating from the signal reproduced by said head the address code associated with each of said sectors scanned by said head;
control signal generating means supplied with the control information read from said memory means and the separated address code for generating a control signal based on said control information and said address code, and including an arithmetic unit for generating reference frequency information from each separated address code and said parameter in the control information read from said memory means; and
rotation control circuit means supplied with said control signal for controlling the rotation of said recording medium while in said CLV reproducing mode such that the linear velocity of the rotation of said recording medium is maintained at said desired constant value indicated by said control information, said recording medium thereby being controllable to any one of said plurality of values in response to the particular control information recorded on that particular recording medium.

2. An apparatus according to claim 1, wherein said control signal generating means further includes a fixed frequency oscillator and a variable divider for frequency dividing the output of said fixed frequency oscillator, the dividing ratio of said variable divider being controlled by the output of said arithmetic unit, and the output of said variable divider being supplied to said rotation control circuit means.

3. An apparatus according to claim 1, wherein said recording medium further includes a CAV recording area and the control information in said special track includes address information indicating the CLV recording area and CAV recording area, further comprising a sensing circuit in said control signal generating means supplied with each separated address code and the address information read from said memory means for sensing whether the sector represented by the address code supplied thereto is in the CLV recording area or CAV recording area to selectively establish said CLV reproducing mode.

* * * * *